United States Patent
Brennan et al.

(10) Patent No.: US 10,401,935 B2
(45) Date of Patent: Sep. 3, 2019

(54) STORAGE DEVICE WITH A POWER SOURCE AND PERSISTENT STORE THAT PROVIDES BACKUP POWER TO DRAM IN A POWER LOSS EVENT

(71) Applicant: SAMSUNG ELECTRONICS CO., LTD., Suwon-si, Gyeonggi-do (KR)

(72) Inventors: Bob Brennan, Santa Clara, CA (US); Gunneswara Marripudi, Fremont, CA (US); Harry Rogers, San Jose, CA (US); Fred Worley, San Jose, CA (US)

(73) Assignee: Samsung Electronics Co., Ltd. (KR)

(*) Notice: Subject to any disclaimer, the term of this patent is extended or adjusted under 35 U.S.C. 154(b) by 97 days.

(21) Appl. No.: 15/191,132

(22) Filed: Jun. 23, 2016

(65) Prior Publication Data

US 2017/0322611 A1   Nov. 9, 2017

Related U.S. Application Data

(60) Provisional application No. 62/331,322, filed on May 3, 2016.

(51) Int. Cl.
*G06F 1/30* (2006.01)
*G06F 3/06* (2006.01)

(52) U.S. Cl.
CPC .............. *G06F 1/30* (2013.01); *G06F 3/0625* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 4,813,072 A | 3/1989 | Moses et al. | |
| 4,894,792 A | 1/1990 | Mitchell et al. | |
| 5,185,705 A | 2/1993 | Farrington | |
| 6,536,671 B1 | 3/2003 | Baentsch | |
| 6,785,786 B1 | 8/2004 | Gold et al. | |
| 7,254,083 B2 | 8/2007 | Beckert et al. | |
| 8,713,137 B2 | 4/2014 | Ji et al. | |
| 9,047,178 B2 | 6/2015 | Talagala et al. | |
| 9,298,558 B2 | 3/2016 | Song | |
| 9,535,828 B1* | 1/2017 | McKelvie | G06F 12/0246 |
| 2014/0201434 A1 | 7/2014 | Hassanpur et al. | |
| 2015/0363272 A1* | 12/2015 | Zheng | G06F 11/1456 714/19 |
| 2016/0283111 A1* | 9/2016 | Guo | G06F 3/061 |
| 2016/0283145 A1* | 9/2016 | Han | G11C 5/141 |
| 2017/0010817 A1* | 1/2017 | Lim | G06F 3/0604 |
| 2017/0147490 A1* | 5/2017 | Arafa | G06F 12/0804 |
| 2017/0168931 A1* | 6/2017 | Kim | G06F 12/0868 |

(Continued)

FOREIGN PATENT DOCUMENTS

WO    90/03611 A2    4/1990

*Primary Examiner* — Danny Chan
(74) *Attorney, Agent, or Firm* — Innovation Counsel LLP

(57) ABSTRACT

A system includes a dynamic random-access memory (DRAM); and a storage device comprising a power source and a persistent store. The storage device is configured to provide reserve power to the DRAM. Data stored in the DRAM is transferred to a reserved storage in the persistent store of the storage device in a power loss event using the reserve power.

24 Claims, 4 Drawing Sheets

(56) References Cited

U.S. PATENT DOCUMENTS

2017/0262344 A1* 9/2017 Shaw .................. G06F 11/1464
2017/0293343 A1* 10/2017 Chinnakkonda
                             Vidyapoornachary ...................... G06F 1/3225

* cited by examiner

STORAGE DEVICE WITH A POWER SOURCE AND PERSISTENT STORE THAT PROVIDES BACKUP POWER TO DRAM IN A POWER LOSS EVENT

CROSS-REFERENCE TO RELATED APPLICATION(S)

This application claims the benefits of and priority to U.S. Provisional Patent Application Ser. No. 62/331,322 filed May 3, 2016, the disclosure of which is incorporated herein by reference in its entirety.

TECHNICAL FIELD

The present disclosure relates generally to computer systems and methods for preserving data, more particularly, to a system and method for providing host memory protection via a powered persistent store.

BACKGROUND

Data loss prevention is a primary goal and a requirement for a data processing system. Hence, large data center administrators must ensure their facilities adopt all economically-viable data loss prevention measures.

Recently, a variety of data loss prevention measures has emerged. Examples of data loss prevention measures include battery backup unit (BBU) methods, uninterruptable power supply (UPS) methods, carbon-based-fuel (e.g., diesel) generator methods, and electrical capacitor based methods. Each of these data loss prevention measures has advantages and disadvantages, however they commonly provide a data protection scheme to copy data stored in a volatile memory (e.g., DRAM) to a persistent store in a case of power loss for subsequent recovery. However, because of the intense cost competitiveness of today's business climate, search for a cost-effective way to achieve data loss prevention continues.

Non-volatile dual in-line memory modules (NVDIMMs) have evolved from the BBU DIMM that uses a backup battery to sustain power to volatile DIMM using an integrated power source. FIG. 1 shows a prior art system for providing data loss prevention. The system 100 includes a power supply 110 that provides a power to a central processing unit (CPU) 101, a dynamic random access memory (DRAM) 102, a NVDIMM 103 including a power-fail-detection and protection logic 113, a power reserve 123, and a solid-state drive (SSD) 104 that includes its own power-fail-detection and protection logic 114. The power reserve 123 of the NVDIMM 103 may be a battery, a supercapacitor, or the like, and typically has a much smaller power capacity than the power supply 110.

When electrical power from the power supply 110 is removed either from an unexpected power loss or a system crash, or from a normal system shutdown, the data stored in the DRAM 102 may be lost, but the power-fail detection and protection logic 113 of the NVDIMM 103 can detect the power outage and retain data by supplying power from the power reserve 123 until the power is restored or the data is backed-up. The storage device 104 that includes its own power-fail detection and protection logic 114 can also detect the power outage without relying on the power-fail detection and protection logic 113 of the NVDIMM 103. The NVDIMM 103 can improve application performance, data security, system crash recovery time and enhance data endurance and reliability.

A data protection scheme involving battery-backed devices merely provide an extra power source to non-volatile memories before they are exhausted. Moreover, the battery-backed devices can be large and or heavy, and exceed allowable server volume or floor-loading weight limits, contain corrosive materials, and generate dangerous fumes as well as explosive hydrogen gas. These disadvantages can make them unreliable, difficult to use, and potentially harmful to facilities, personnel, and the environment.

SUMMARY

According to one embodiment, a system includes: a dynamic random-access memory (DRAM); and a storage device comprising a power source and a persistent store. The storage device is configured to provide reserve power to the DRAM. Data stored in the DRAM may be transferred to a reserved storage in the persistent store of the storage device in a power loss event using the reserve power.

According to another embodiment, a method includes: providing a storage device comprising a power source and a persistent store; providing reserve power to a DRAM using the power source of the storage device; detecting a power loss event; and upon detecting the power loss event, transferring data stored in the DRAM to a reserved storage in the persistent store of the storage device using the reserve power.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
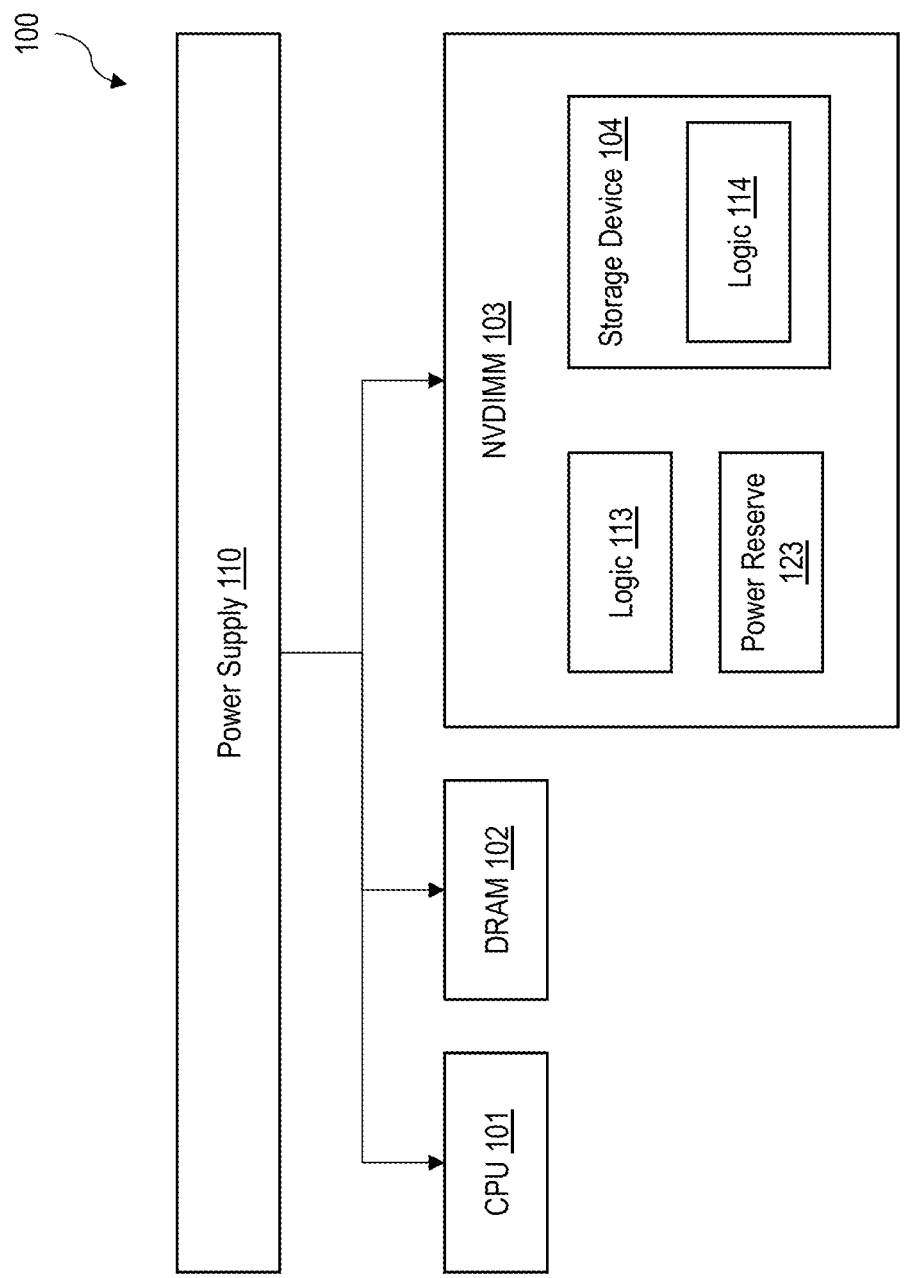
FIG. 1 shows a prior art system for providing data loss prevention.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide host memory protection via powered persistent store. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a computer system and a method for providing data loss prevention. The present computer system can provide a commercially competitive solution to achieve cost-effective data loss prevention and recovery.

Figure 2:
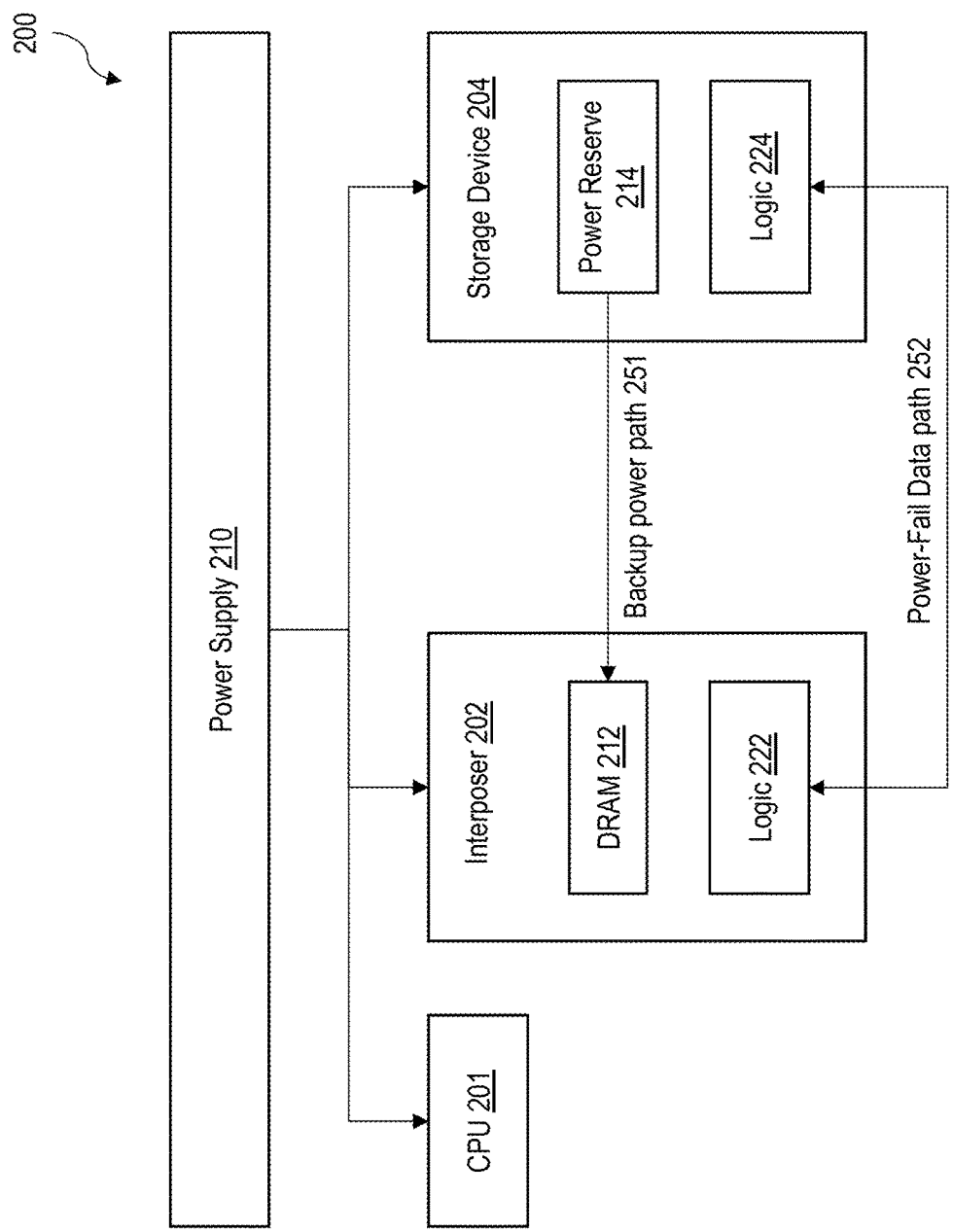
FIG. 2 illustrates an example system including a persistent storage device, according to one embodiment.

FIG. 2 illustrates an example system including a persistent storage device, according to one embodiment. The system 200 includes a power supply 210 that provides power to a CPU 201, a DRAM 212, and a persistent storage device 204. The DRAM 212 may be coupled to an interposer 202 that includes a power-fail detection and protection logic 222. The interposer 202 may be placed between a standard DRAM socket (e.g., a DIMM socket) and a standard DIMM (e.g., DRAM 212). The interposer 202 may have a pinout arrangement corresponding to the pinout of the DRAM 212 that is compatible with a memory slot of a motherboard (not shown) of the system that otherwise directly accepts the DRAM 212.

The persistent storage device 204 may be conveniently referred to as a storage device or a non-volatile storage device. Examples of the storage device 204 include, but are not limited to, flash drives, serial advanced technology attachment (SATA) drives, parallel ATA (PATA) drives, serial attached small computer serial interface (SAS) drives, Fibre channel storage drives, and the like. The storage device 204 can contain a device-level electrical power reserve, herein referred to as a power reserve 214, and its own power-fail detection and protection logic 224. The power reserve 214 of the storage device 204 can supply power required to transfer data from the volatile memory DRAM 212 to a persistent store in the event of power failure. The power-fail detection and protection logic 222 of the interposer 202 and the power-fail detection and protection logic 224 of the storage device 204 can communicate with each other over a dedicated power-fail data path.

To preserve data stored in the DRAM 212 in the event of system power failure, active data stored in the DRAM 212 must be saved to a persistent store before the DRAM 212 loses power. The storage device 204 can provide a backup power path 251 and/or a direct power-failure data path 252 between the storage device 204 and the DRAM 212. The electrical power reserve 214 in the storage device 204 can provide electrical power to the DRAM 212 in the absence of any system-level redundant power supply to allow the data stored in the DRAM 212 to be safely transferred to the storage device 204.

Figure 3:
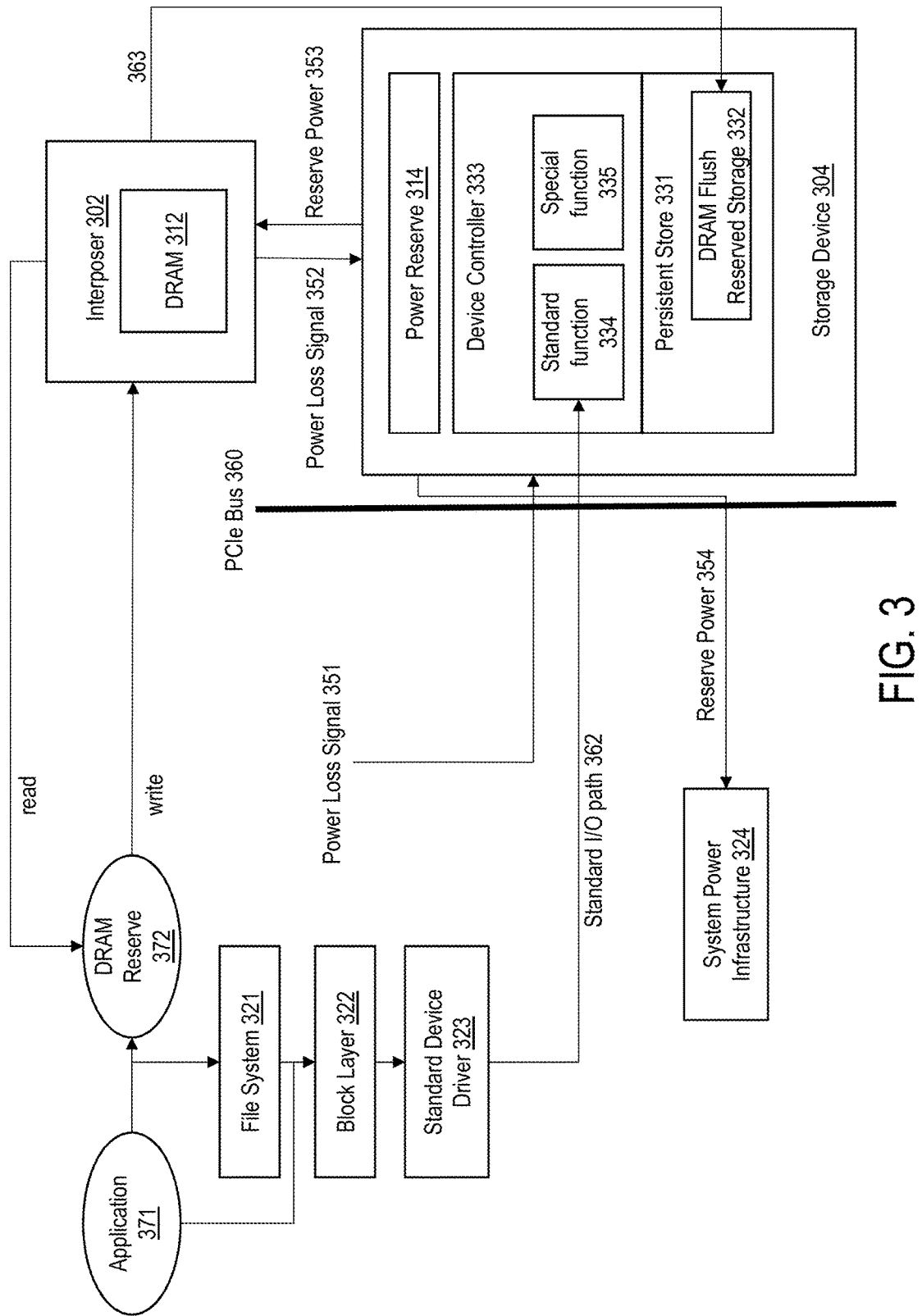
FIG. 3 illustrates an example power persistent store system, according to one embodiment.

FIG. 3 illustrates an example power persistent store system, according to one embodiment. An application program 371 of a host computer can generate read and write commands to read data from and write data to a file system 321. The application program 371 can also access the operating system of the host computer. The operating system may include a block layer 322 to provide an interface to block devices such as a standard device driver 323 for the storage device 304. In some embodiments, the functionality of the block layer 322 may be incorporated into the file system 321. The read and write commands directed from the application program to the file system 321 are forwarded to the standard device driver 323, and the standard device driver 323 can formulate device-level I/O commands and send the I/O commands to the storage device 304 via a standard I/O path 362. The standard I/O path 362 may be established over a local I/O bus (e.g., PCIe bus 360) or a network (not shown). The DRAM reserve 372 can temporarily store data written to the coupled DRAM 312.

According to one embodiment, the storage device 304 can detect a power loss of the system by monitoring one or more power loss signals. For example, the storage device 304 can receive the power loss signal 351 through a system-level or chassis-level interface. An interposer 302 on which the DRAM 312 is mounted can include an integrated power-fail detection logic (not shown) and provide the power loss signal 352 to the storage device 304 through a dedicated path. The storage device 304 can detect a detailed power status and a severity level of a power loss by analyzing the power loss signal 351 and/or 352, alone or in combination with other signals.

In response to a power loss signal (e.g., 351 and/or 352), the storage device 304 can supply a reserve power from the power reserve 314 to the DRAM 312 through a reserve power interface 353. Examples of the power reserve 314 include, but are not limited to, an integrated battery and a supercapacitor. The reserve power interface 353 is connected directly to the DRAM 312, or via the interposer 302. The interposer 302 may have a dedicated pin for the reserve power interface 353 to connect the DRAM 312 to the power reserve 314 of the storage device 304.

According to another embodiment, the reserve power of the storage device 304 can be connected to a system power infrastructure 324 via a reserve power interface 354. In this case, the native data path of the power persistent store system between the storage device 304 and the DRAM 312 can be powered by the reserve power interface 354. The native data path may include an IO bus (e.g., PCIe bus 360), on-processor coherent memory interconnects, DRAM data pins, etc. The system power infrastructure 324 powered by the power reserve 314 can supply power to the DRAM 312 and other system components such as a memory controller to effect persistent data transfer in an event of a power loss or a power transition. Either through the direct reserve power interface 353 or the system power infrastructure 324, the power reserve 314 of the storage device 304 can supply power to the DRAM 312, and the data stored in the DRAM 312 can be safely transferred to the persistent store 331 of the storage device 304.

According to one embodiment, the DRAM 312 or the interposer 302 can establish a dedicated data path 363 to the persistent store 331 to transfer the data stored in the DRAM 312 to the persistent store 331. The persistent store 331 can have a reserved storage space, herein referred to as a DRAM flush reserved storage 332, for storing the transferred data from the DRAM 312. When the normal data path between the DRAM 312 and the storage device 304 is not powered, the dedicated data path 363 can be used to transfer data from the DRAM 312 to the persistent store 331. The persistent storage 311 can be configured to store the transferred data in the DRAM flush reserved storage 332 with the location information of the transferred data.

Figure 4:
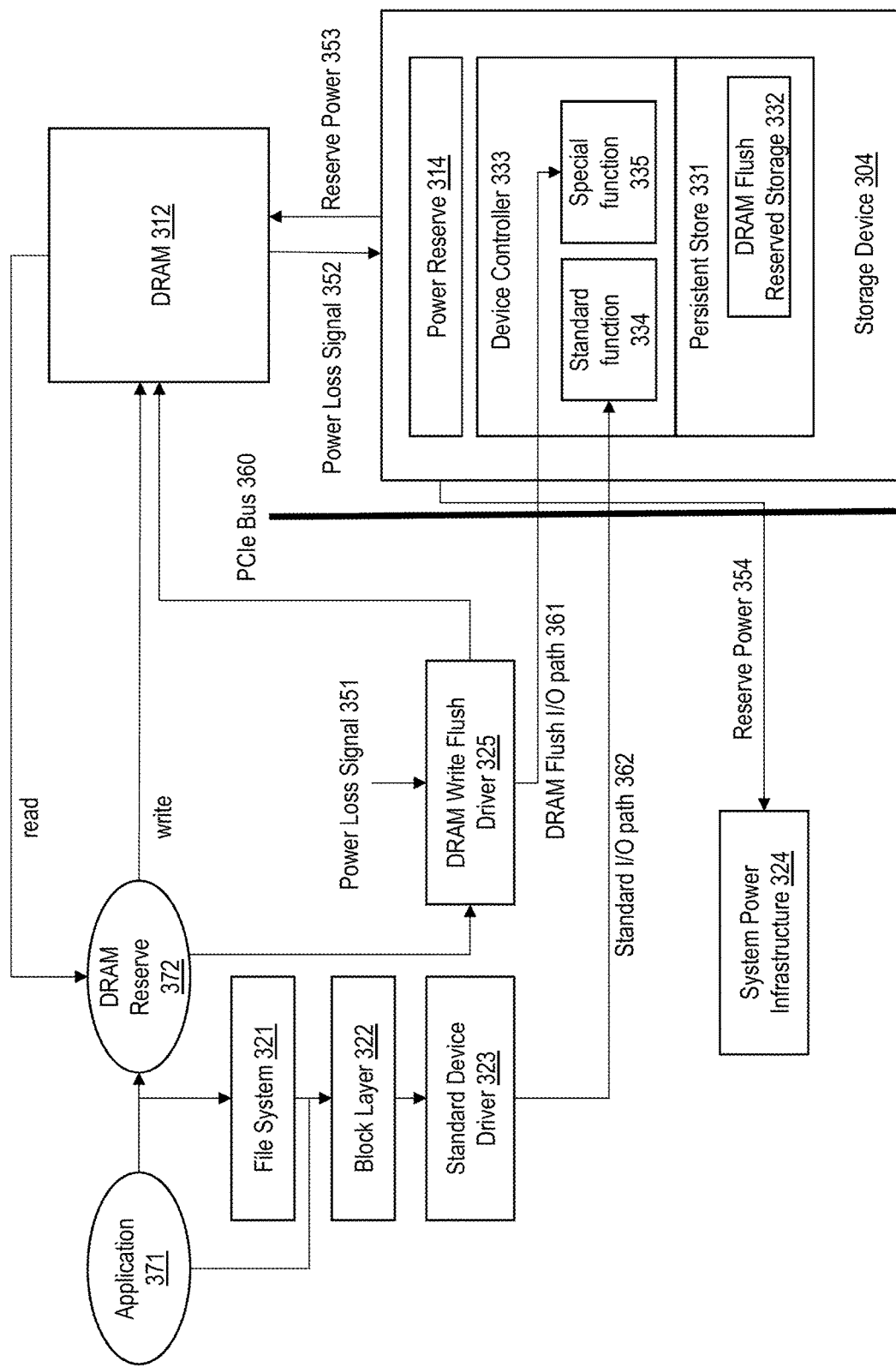
FIG. 4 illustrates an example power persistent store system, according to another embodiment.

FIG. 4 illustrates an example power persistent store system, according to another embodiment. The power persistent store system illustrated in FIG. 4 may have elements and/or constructions substantially the same as or similar to the system illustrated in FIG. 3 except for a write data path for writing data to the persistent store 331. Thus, detailed descriptions on repeated elements, interfaces, and/or paths may be omitted.

The data stored in the DRAM 312 can be transferred from the DRAM 312 to the persistent store 331 using a special physical data path. The operating system of the host computer can interface with a DRAM write flush driver 325, and establish a DRAM flush I/O path 361 to connect the DRAM write flush driver 325 to the storage device 304. The operating system can duplicate the DRAM update activities in the DRAM reserve 372. The DRAM write flush driver 325 can receive the location of the data written to the DRAM 312 by monitoring the host operating system's DRAM update activities to the DRAM reserve 372. Via the DRAM flush I/O path 361, the DRAM write flush driver 325 can communicate with a special function 335 of a device controller 333 of the storage device 304 and copy the updated DRAM data to the persistent store 331.

According to one embodiment, the storage device 304 is a non-volatile memory express (NVMe) device. The system simultaneously can use the NVMe device as a standard storage device as well as a persistent data storage device. The transfer of DRAM data that may occur in an event of a power loss or a power transition can be distinguished from the standard DRAM write operation using a different tag in a write request. The write-request tagging can have various approaches.

The first approach can use a unique multi-stream ID to identify DRAM data if the storage device 304 supports multi-stream I/O operations. The second approach (as depicted in FIG. 4) has the DRAM write flush driver 325 write data to a special physical function 335 that is distinct from the standard physical function 334 used for standard I/O requests. The third approach has the DRAM write flush driver 325 write data to a special logical or virtual function that is distinct from other logical, virtual or physical functions used for traditional I/O requests.

When the storage device 304 receives a DRAM write tagged write request, the storage device 304 saves the DRAM write tagged write data in a specially-reserved area (i.e., DRAM flush reserved storage 332). The DRAM flush reserved storage 332 may be optionally accessible using multiple parallel access operations for maximum transfer performance. For minimum-latency, DRAM flush reserved storage 332 is always ready to write all data immediately without an excessive delay from operations such as SSD NAND flash garbage collection.

According to one embodiment, the storage device 304 can concurrently handle both traditional application write requests and I/O requests from the DRAM write flush driver 325. This approach can replace conventional NVDIMM persistent storage capacity that can be costly with inexpensive, commercially-available, and commodity persistent storage device 304.

Referring to FIG. 4, when the DRAM write flush driver 325 receives a power loss signal 351 via a system-level or a chassis-level interface indicating that power loss is imminent, the DRAM write flush driver 325 can signal the storage device 304 that the power loss is imminent. The power loss signaling to the storage device 304 by the DRAM write flush driver 325 may be optional. Alternatively, the storage device 304 may receive the power loss signal 352 from the DRAM 312, or the storage device 304 may have an integrated power-fail detection logic.

According to one embodiment, the power loss signal 351 may allow the storage device 304 to more rapidly respond to an abrupt request from the DRAM write flush driver 325 by quiescing the host interface to halt the host computer from submitting additional traditional I/O requests to the standard physical function 334 of the storage device 304 and committing all pending host requests to the persistent store 331. The DRAM write flush driver 325 can present write requests to the storage device 304 to preserve the DRAM data to the persistent store 331. The write requests by the DRAM write flush driver 325 can be tagged differently to distinguish them from normal write requests made by the standard device driver 323. When the data preservation operation is complete, the storage device 304 can serve an indicator, for example an emergency preservation flag, to the host computer and/or the DRAM write flush driver 325 that an emergency DRAM write preservation operation has occurred and completed. At this time, the persistent storage of the DRAM 312 is complete and the storage device 304 can cease to provide power to the DRAM 312 and/or the host system power infrastructure 324.

On a restart of the host computer after the main power supply of the system is restored, the DRAM write flush driver 325 queries the storage device 304 using the special physical function 335 to determine if operations terminated normally. If so, the DRAM write flush driver 325 can begin normal operations. Otherwise, the DRAM write flush driver 325 coordinates with the storage device 304 to reload the plurality of system's DRAM data. When the restoration operation is complete, the storage device 304 can automatically reset the emergency preservation flag. Alternately, the DRAM write flush driver 325 can issue a command to direct the storage device 304 to reset the emergency preservation flag. The host computer can also use this command to force a flag reset. Although the examples described with reference to FIGS. 3 and 4 show a single storage device 304 including the persistent store 331, it should be noted that the DRAM data can be persisted to a plurality of storage devices, and a plurality of servers can share the plurality of storage devices.

In one embodiment, the present persistent storage device may be one or more PCIe-attached SSDs. In another embodiment, the persistent storage device may be one or more SAS or SATA SSDs that expose a PCIe function to the host operating system. In the case where the present persistent storage device is a PCIe NVMe SSD that exposes only a single PCIe function, the present persistent storage device can support a tag in a command to indicate the write requests that are received from the DRAM flush driver 325.

According to some embodiments, the present persistent storage device may be a RAID controller with a battery or capacitor-backed data storage. The present persistent storage device may include any types of persistent and non-volatile memories incorporating, or paired with, a power source.

According to one embodiment, the present storage device can provide hot power removal protection. An integrated storage device, such as an SSD attached over Ethernet, can have an integrated processor and receive its primary power from a mounting socket or Ethernet connection. In this case, the integrated storage device can run a service application on the integrated processor and recover from a sudden power loss event, for example, in a hot removal operation of the storage device from its enclosure. To recover from the hot removal operation, the integrated storage device can use the reserve power supplied to flush the SSD's DRAM data to the persistent store. The same reserve power can be used to flush the processor's DRAM to the persistent store. The integrated storage device can mitigate issues of conventional persistent stores that require special cables, tethers, or components to and from the DRAM.

According to one embodiment, a system includes: a dynamic random-access memory (DRAM); and a storage device comprising a power source and a persistent store. The storage device is configured to provide reserve power to the DRAM. Data stored in the DRAM may be transferred to a reserved storage in the persistent store of the storage device in a power loss event using the reserve power.

The power source of the storage device may be a battery or a supercapacitor integrated with the storage device.

The DRAM may be coupled to an interposer, and the interposer may provide a dedicated data path to transfer the data stored in the DRAM to the reserved storage.

The system may further include a power fail detection logic configured to provide a power loss signal to the storage device indicating the power loss event.

The DRAM may be coupled to an interposer that includes the power fail detection logic, and the interposer may provide the power loss signal to the storage device.

The storage device may receive the power loss signal through a system-level or chassis-level interface.

The DRAM may be coupled to an interposer, and the power source of the storage device may be connected to the interposer via a dedicated power path to power to the DRAM.

The power source of the storage device may be connected to a system power infrastructure to power the DRAM.

The storage device may further include a device controller including a standard function for processing standard input/output (I/O) operations over a standard I/O path and a special function for processing DRAM flush I/O operations over a DRAM flush I/O path.

The system may further include a DRAM write flush driver configured to transfer the data stored in the DRAM to the reserved storage via the DRAM flush I/O path using the special function of the device controller.

The DRAM write flush driver may be configured to communicate with the special function of the device controller over a PCIe bus.

The system may further include a DRAM reserve configured to store duplicate data written to the DRAM. The DRAM write flush driver may be configured to transfer the data from the DRAM reserve to the reserved storage.

According to another embodiment, a method includes: providing a storage device comprising a power source and a persistent store; providing reserve power to a DRAM using the power source of the storage device; detecting a power loss event; and upon detecting the power loss event, transferring data stored in the DRAM to a reserved storage in the persistent store of the storage device using the reserve power.

The power source of the storage device may be a battery or a supercapacitor integrated with the storage device.

The DRAM may be coupled to an interposer. The method may further include providing a dedicated data path from the interposer to transfer the data stored in the DRAM to the reserved storage.

The method may further include providing a power loss signal to the storage device indicating the power loss event.

The DRAM may be coupled to an interposer that provides the power loss signal to the storage device.

The storage device may receive the power loss signal through a system-level or chassis-level interface.

The DRAM may be coupled to an interposer, and the power source of the storage device may be connected to the interposer via a dedicated power path to power the DRAM.

The power source of the storage device may be connected to a system power infrastructure to power the DRAM.

The storage device may further include a device controller including a standard function for processing standard I/O operations over a standard I/O path and a special function for processing DRAM flush I/O operations over a DRAM flush I/O path.

The method may further include: providing a DRAM write flush driver; and transferring the data stored in the DRAM to the reserved storage via the DRAM flush I/O path between the DRAM write flush driver and the special function of the device controller.

The DRAM write flush driver may be configured to communicate with the special function of the device controller over a PCIe bus.

The method may further include: providing a DRAM reserve configured to store duplicate data written to the DRAM; and transferring the data from the DRAM reserve to the reserved storage using the DRAM write flush driver.

The above example embodiments have been described hereinabove to illustrate various embodiments of implementing a system and method for providing host memory protection via powered persistent store. Various modifications and departures from the disclosed example embodiments will occur to those having ordinary skill in the art. The subject matter that is intended to be within the scope of the invention is set forth in the following claims.

What is claimed is:

1. A system comprising:
a memory module comprising a dynamic random-access memory (DRAM); and
a storage device comprising a power source and a persistent store,
wherein the memory module is coupled to the system via a memory interface, and the storage device is coupled to the system via a peripheral component interconnect express (PCIe) bus,
wherein the memory module is deficient of an internal power supply to provide power to the DRAM in a power loss event,
wherein the storage device is separate from the memory module and configured to externally provide reserve power to the DRAM using the power source in the power loss event, and
wherein a DRAM write flush driver monitors update activities to the DRAM and transfers data stored in the DRAM and a location of the data to a reserved storage in the persistent store of the storage device via a DRAM flush I/O path in the power loss event using the reserve power.

2. The system of claim 1, wherein the power source of the storage device is a battery or a supercapacitor integrated with the storage device.

3. The system of claim 1, wherein the DRAM write flush driver provides the DRAM flush I/O path to transfer the data stored in the DRAM to the reserved storage.

4. The system of claim 1, further comprising a power fail detection logic configured to provide a power loss signal to the storage device indicating the power loss event.

5. The system of claim 1, wherein the power source of the storage device is connected to a system power infrastructure to power the DRAM.

6. The system of claim 1, wherein the storage device further comprises a device controller including a standard function for processing standard input/output (I/O) operations over a standard I/O path and a special function for processing DRAM flush I/O operations over the DRAM flush I/O path.

7. The system of claim 6, wherein the DRAM write flush driver is configured to transfer the data stored in the DRAM to the reserved storage via the DRAM flush I/O path using the special function of the device controller.

8. The system of claim 7, wherein the DRAM write flush driver is configured to communicate with the special function of the device controller over the PCIe bus.

9. The system of claim 7, further comprising a DRAM reserve configured to store duplicate data written to the DRAM, wherein the DRAM write flush driver is configured to transfer the data from the DRAM reserve to the reserved storage.

10. A method comprising:
providing a storage device comprising a power source and a persistent store;
externally providing reserve power to a DRAM of a memory module using the power source of the storage device that is separate from the memory module in a power loss event, wherein the memory module is coupled to a power persistent store system via a memory interface, and the storage device is coupled to the power persistent store system via a peripheral component interconnect express (PCIe) bus, and wherein the memory module is deficient of an internal power supply to provide power to the DRAM in the power loss event;
monitoring update activities to the DRAM using a DRAM write flush driver;
detecting the power loss event; and
upon detecting the power loss event, transferring data stored in the DRAM and a location of the data to a reserved storage in the persistent store of the storage device via a DRAM flush I/O path using the reserve power.

11. The method of claim 10, wherein the power source of the storage device is a battery or a supercapacitor integrated with the storage device.

12. The method of claim 10, wherein the DRAM is coupled to an interposer, and the method further comprises providing the DRAM flush I/O path from the interposer to transfer the data stored in the DRAM to the reserved storage.

13. The method of claim 10, further comprising providing a power loss signal to the storage device indicating the power loss event.

14. The method of claim 13, wherein the DRAM is coupled to an interposer that provides the power loss signal to the storage device.

15. The method of claim 13, wherein the storage device receives the power loss signal through a system-level or chassis-level interface.

16. The method of claim 10, wherein the DRAM is coupled to an interposer, and the power source of the storage device is connected to the interposer via a dedicated power path to power the DRAM.

17. The method of claim 10, wherein the power source of the storage device is connected to a system power infrastructure to power the DRAM.

18. The method of claim 10, wherein the storage device further comprises a device controller including a standard function for processing standard I/O operations over a standard I/O path and a special function for processing DRAM flush I/O operations over the DRAM flush I/O path.

19. The method of claim 18, further comprising:
providing a DRAM write flush driver; and
transferring the data stored in the DRAM to the reserved storage via the DRAM flush I/O path between the DRAM write flush driver and the special function of the device controller.

20. The method of claim 19, wherein the DRAM write flush driver is configured to communicate with the special function of the device controller over the PCIe bus.

21. The method of claim 19, further comprising:
providing a DRAM reserve configured to store duplicate data written to the DRAM; and
transferring the data from the DRAM reserve to the reserved storage using the DRAM write flush driver.

22. The system of claim 1, wherein a write request that is received via the DRAM flush I/O path is tagged with a different tag to distinguish from a normal write request that is received via a standard I/O path.

23. The system of claim 1, wherein a standard device driver of an operating system of a host computer sends I/O commands to the persistent store via a standard I/O path, and wherein the DRAM flush I/O path is different from the standard I/O path.

24. A system comprising:
a memory module comprising a dynamic random-access memory (DRAM), wherein the memory module is coupled to the system via a memory interface and deficient of an internal power supply to provide power to the DRAM in a power loss event; and
a storage device comprising a power source and a persistent store, wherein the storage device is separate from the memory module and coupled to the system via a peripheral component interconnect express (PCIe) bus, and configured to externally provide reserve power to the DRAM using the power source in the power loss event; and
an interposer configured to establish a dedicated data pin to connect the DRAM of the memory module to the persistent store and transfer data stored in the DRAM of the memory module to a reserved storage in the persistent store of the storage device via a dedicated data path established using the dedicated data path pin in the power loss event using the reserve power,
wherein a standard device driver of an operating system of a host computer sends I/O commands to the persistent store via a standard I/O path without using the dedicated data pin, and
wherein the dedicated data path is different from the standard I/O path.

* * * * *